Dec. 23, 1952     R. A. COPELAND     2,622,980
PHOTOGRAPHIC FILTER AND ANTIHALATION LAYERS
CONTAINING 3-(BENZYLIDENE)-SULFO-OXINDOLES
Filed Nov. 18, 1950

INVENTOR
RALPH A. COPELAND
BY    Henry W. Coughlin
       Henry B. Kellog
ATTORNEYS Patented Dec. 23, 1952

2,622,980

UNITED STATES PATENT OFFICE 2,622,980

PHOTOGRAPHIC FILTER AND ANTIHALATION LAYERS CONTAINING 3-(BENZYLIDENE)-SULFO-OXINDOLES

Ralph A. Copeland, Chenango Bridge, N. Y., assignor to General Aniline & Film Corporation, New York, N. Y., a corporation of Delaware Application November 18, 1950, Serial No. 196,531

12 Claims. (Cl. 95—8)

This invention relates to filter and anti-halation layers for photographic materials and particularly to 3-(benzylidene)-sulfo-oxindole dyes as photographic filter and anti-halation agents.

It is known in the photographic art that in multi-layer color films, color separation by the various layers is facilitated by the employment of filters either incorporated directly into the emulsion layers or added as adjacent layers in the appropriate sequence. In a similar manner colored light absorbing layers are directly employed adjacent to a photographic support in order to prevent light scattering or halation effects caused by reflection of light rays from the support onto the sensitive layer. Such layers are commonly known as anti-halation layers.

In order to perform their desired functions, filter and anti-halation dyes must be reasonably stable in a colloid carrier. They must be readily dischargeable in the customary processing baths. Moreover, it is essential that they have no injurious effects, such as desensitizing or fogging action, on the emulsion layers. Many dyes suggested by the art as suitable for filter and anti-halation agents fail to fulfill completely all of these requirements.

Dyestuffs obtained by condensing an oxindole or 1,3,3-trimethyl-2-methyleneindoline with a p-dialkylaminobenzaldehyde and dyestuffs obtained by condensing oxythionaphthone with aromatic or cyclic aldehydes have been suggested as filter and anti-halation agents. Dyestuffs of the former group although reasonably stable in a colloid carrier and non-diffusing, are not readily removable in the customary processing baths and have a pronounced tendency to effect the emulsion speed when in close proximity to a silver halide emulsion layer, whereas dyestuffs of the latter group have a tendency to couple with oxidized color developers and thus give rise to the formation of undesirable magenta stains. In addition, their presence in color developers produces an undesirable retarding action on the developing capacity of the top emulsion layer of a multilayer color film. Moreover, they have a desensitizing action on the silver halide emulsion layers and as a consequence diminish the speed of such emulsions.

Accordingly, therefore, it is an object of the present invention to provide a new class of filter and anti-halation dyes which are readily removable in the customary processing baths, do not cause stain, nor affect the emulsion speed, and do not possess any retarding action on the developing capacity of the top emulsion layer of a multicolor film.

It is another object of the present invention to provide a new class of filter dyes which are compatible with photographic emulsions without causing any undesirable photographic effect and can, therefore, be added to one or more layers of a multilayer color film.

It is a further object of the present invention to provide novel filter and anti-halation dyes which are non-diffusing and are readily dischargeable in the customary processing baths.

Other objects and advantages will appear hereinafter.

I have discovered that by condensing a sulfonated oxindole with an arylaldehyde of the benzene series of a heterocyclic aldehyde of the furan, thiophene and pyrrole series, filter and anti-halation dyestuffs are obtained which fulfill all of the foregoing objects. I have further discovered that it is essential, in fact imperative, to have at least one sulfonic acid group present in the oxindole nucleus which imparts the new and unexpected properties. The substitution in the oxindole nucleus of at least one sulfonic acid group prevents the formation of magenta stain in filter layers after color development and the desensitizing action on the silver halide grains. No definite explanation of this phenomenon is available at the present time, but it is believed that the sulfonic acid group in the oxindole nucleus either prevents coupling with the oxidation product of the developing agent entirely or facilitates the complete removal of any dye formed by coupling.

The filter and anti-halation dyestuffs of the present invention are characterized by the following general formula:

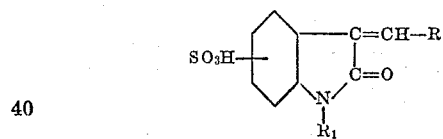

wherein R represents an aryl radical of the benzene series, such as phenyl which is either unsubstituted or substituted by one or more hydroxy, sulfonic, lower alkyl, e. g., methyl, ethyl, propyl, butyl, etc., lower alkoxy, e. g., methoxy, ethoxy, propoxy, butoxy, etc., lower dialkylamino, e. g., dimethylamino, diethylamino, pyridine, and the like, or a monocyclic heterocyclic radical, e. g., furan, thiophene, pyrrole, etc., and wherein $R_1$ is hydrogen or an alkyl radical of not more than 22 carbon atoms, e. g., methyl, ethyl, propyl, butyl, isobutyl, octyl, decyl, dodecyl, hexadecyl, docosyl, and the like, an aryl radical, e. g., phenyl, tolyl, xylyl, etc., alkoxyphenyl, e. g., methoxyphenyl, ethoxyphenyl, propoxyphenyl, or an aralkyl radical, e. g., benzyl, phenethyl and the like.

The process of preparing the above oxindole dyes comprises condensing a sulfonated oxindole with an arylaldehyde of the benzene series or with a monocyclic heterocyclic aldehyde. The aldehyde may contain none, one, or several auxochromic groups, such as hydroxy, secondary, or tertiary amino groups, and the like.

The sulfo-oxindoles, in which the sulfo group is in either the 4,5,6, or 7-position, are prepared with modification according to the procedures of Martinet and Dornier (Compt. Rend. 172, 1415, 1921).

The sulfo-oxindoles, in which the heterocyclic nitrogen atom is substituted by an alkyl, aryl, and aralkyl group, are prepared by reacting an N-alkyl, aryl, or aralkyl substituted aniline with chloracetyl chloride, heating the resulting α-chloro-N-alkyl-, aryl-, or aralkyl-acetanilide in the presence of anhydrous aluminum chloride, and sulfonating the oxindole thus formed.

The following are examples of suitable aldehydes which may be employed in the condensation reaction:

benzaldehyde
benzaldehyde-o-sulfonic acid
benzaldehyde-m-sulfonic acid
benzaldehyde-2,4-disulfonic acid
4-dimethylaminobenzaldehyde
4-diethylaminobenzaldehyde-2-sulfonic acid
4-tolualdehyde
4-cuminaldehyde
4-hydroxybenzaldehyde
3-hydroxybenzaldehyde
2-hydroxy-3-methoxybenzaldehyde
4-hydroxy-3-methoxybenzaldehyde
3,4-dimethoxybenzaldehyde
4-hydroxy-o-tolualdehyde
3-methoxybenzaldehyde
3-ethoxybenzaldehyde
4-methoxybenzaldehyde
4-propoxybenzaldehyde
3-methoxy-o-tolualdehyde
2-methoxy-m-phenetylaldehyde
2-hydroxy-m-phenetylaldehyde
4-hydroxy-3-sulfobenzaldehyde
3,4-dihydroxybenzaldehyde
4-aminobenzaldehyde
2-furfuraldehyde
terephthaldehyde
2-thiophenealdehyde
indole-3-aldehyde.

The following examples describe in detail the methods for accomplishing the above objects, but it is to be understood that they are inserted merely for the purpose of illustration and are not to be construed as limiting the scope of the invention.

*Example I*

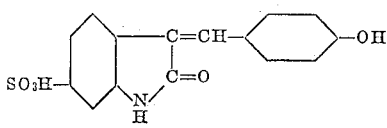

3-(4'-hydroxybenzylidene)-6-sulfo-oxindole

Fifty four grams of phenylacetic acid were dissolved in 210 grams of concentrated sulfuric acid and warmed on a steam bath for 3 hours. The solution was then chilled to a temperature between 0° and 10° C. and a solution of 26 grams of fuming nitric acid, having a specific gravity of 1.5, in 40 grams of concentrated sulfuric acid was added slowly. The solution was poured into 1500 cc. of a cold, saturated sodium chloride solution. After standing overnight, the resulting 4-sulfo-2-nitrophenylacetic acid was filtered off and triturated with acetone. The yield of the nitro product was 53 grams. After crystallization from a minimum amount of boiling water, colorless crystals were obtained.

A water solution of the nitro compound was reduced catalytically with a palladium-charcoal catalyst. After removal of the catalyst, the water was removed by distillation at reduced pressure (or by evaporation) and the residue crystallized from either a hot saturated sodium chloride solution or water. The resulting product is 6-sulfo-oxindole.

2.35 grams of 6-sulfo-oxindole and 1.3 grams of 4-hydroxybenzaldehyde were dissolved in 100 ml. of methanol. After adding a few drops of piperidine, the solution was refluxed for 4 hours during which time it turned gradually deep orange in color. The methanol was distilled off and the residue triturated with acetone. This product is very soluble in water, but can be crystallized from a hot saturated sodium chloride solution to yield yellow-orange needles.

*Example II*

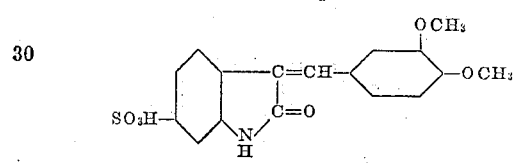

3-(3',4'-dimethoxybenzylidene)-6-sulfo-oxindole

Example I was repeated with the exception that 1.3 grams of 4-hydroxybenzaldehyde were replaced by 1.8 grams of 3,4-dimethoxybenzaldehyde.

*Example III*

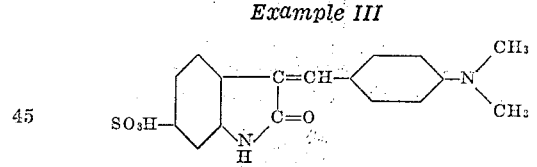

3-(4'-dimethylaminobenzylidene)-6-sulfo-oxindole

Example I was repeated with the exception that 1.3 grams of 4-hydroxybenzaldehyde were replaced by 1.65 grams of 4-dimethylaminobenzaldehyde.

*Example IV*

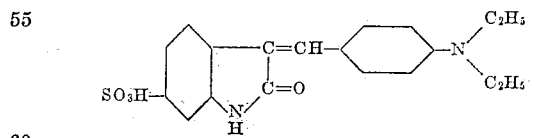

3-(4'-diethylaminobenzylidene)-6-sulfo-oxindole

Example I was repeated with the exception that 1.3 grams of 4-hydroxybenzaldehyde were replaced by 1.95 grams of 4-diethylaminobenzaldehyde.

*Example V*

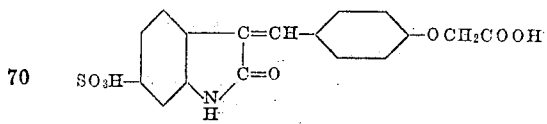

3-(4'-carboxymethoxybenzylidene)-6-sulfo-oxindole

Example I was repeated with the exception that 1.3 grams of 4-hydroxybenzaldehyde were replaced by 2.0 grams of 4-carboxymethoxybenzaldehyde.

Example VI

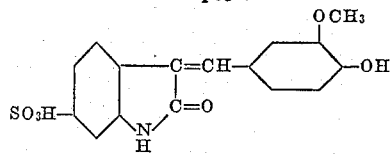

3-(3'-methoxy-4'-hydroxybenzylidene)-6-sulfo-oxindole

Example I was repeated with the exception that 1.3 grams of 4-hydroxybenzaldehyde were replaced by 1.65 grams of 3-methoxy-4-hydroxybenzaldehyde.

Example VII

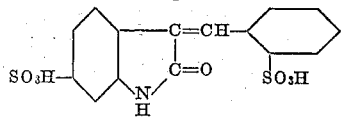

3-(2'-sulfobenzylidene)-6-sulfo-oxindole

Example I was repeated with the exception that 1.3 grams of 4-hydroxybenzaldehyde were replaced by 1.9 grams of 2-sulfobenzaldehyde.

Example VIII

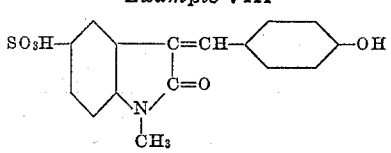

1-methyl-3-(4'-hydroxybenzylidene)-5-sulfo-oxindole

To 107 grams of N-methylaniline dissolved in 200 ml. of ether, 113 grams of chloracetyl chloride were added dropwise. The mixture was heated to reflux for 1 hour. Thereafter, the ether was removed and the residual oil poured into water. The resultant solid was filtered off, dried at 40° C. and crystallized from petroleum ether (B. P. 90–100° C.). A crystalline product melting at 68° C. was obtained in 86% yield.

The α-chloro-N-methylacetanilide thus formed and an equal weight of anhydrous aluminum chloride were mixed and heated to 175–185° C. Heating was continued until the evolution of hydrogen chloride ceased. The resulting 1-methyloxindole was cooled to about 50° C. and poured into ice. The yellow solid formed was filtered off, washed with water and crystallized from cooling water in the form of colorless crystals which melted at 83–84° C.

25 grams of the crystallized product were dissolved in 100 ml. of concentrated sulfuric acid and the solution warmed on a steam bath for 6 hours. After cooling, it was poured into a saturated sodium chloride solution whereupon plate-like crystals separated. 30 grams of the crude crystals were taken up in 90 ml. of boiling water, filtered and chilled. Shiny plates of 1-methyl-5-sulfo-oxindole separated.

4.5 grams of 1-methyl-5-sulfo-oxindole, 2.4 grams of 4-hydroxybenzaldehyde and 0.5 cc. of piperidine were refluxed for 3 hours in 100 cc. of methanol. On evaporation of the alcohol, a yellow-orange product was obtained.

Example IX

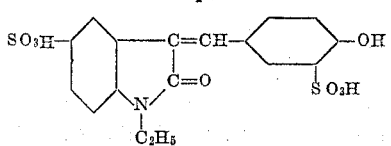

1-ethyl-3-(4'-hydroxy-3'-sulfobenzylidene)-5-sulfo-oxindole

Example VIII was repeated with the exception that 107 grams of N-methylaniline and 2.4 grams of 4-hydroxybenzaldehyde were replaced by 121 grams of N-ethylaniline and 4.0 grams of 3-sulfo-4-hydroxybenzaldehyde, respectively.

Example X

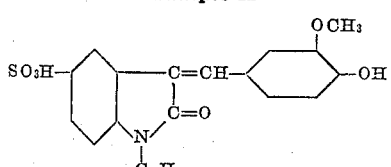

1-octadecyl-3-(3'-methoxy-4'-hydroxybenzylidine)-5-sulfo-oxindole

This compound was prepared in a manner similar to that of Example VIII with the exception that 107 grams of N-methylaniline and 2.4 grams of 4-hydroxybenzaldehyde were replaced by 347 grams of N-octadecylaniline and 3.0 grams of 3-methoxy-4-hydroxybenzaldehyde, respectively.

The use of anilines having a substituent on the nitrogen atom, such as alkyl, e. g., ethyl, propyl, butyl, octyl, decyl, and hexadecyl; aryl, e. g., tolyl, xylyl, and methoxyphenyl; aralkyl, e. g., phenethyl and the like, leads to various 1-substituted sulfo-oxindole benzylidene derivatives, all of which may be employed for the purpose of the present invention.

Various concentrations of each of the foregoing dyes were added to a color developer and prints developed therein. No color coupling, emulsion speed retardation, or stain could be detected. Various concentrations of each of the dyes in 5% gelatin were coated on glass plates. Upon drying, no crystallization of the dye occurred. Light absorption characteristics of each of the dyes in a buffered gelatin (pH greater than 8) showed excellent absorption up to 540 m$\mu$.

The amount of the oxindole dye to be employed in either a filter or anti-halation layer will vary somewhat depending upon the color desired. In general, an amount ranging from 1 gram to 15 grams per liter of a 10% colloid dispersion may be used. The sulfonated oxindole dyestuffs of the present invention are very intense in color and, therefore, may be used as photographic filter and anti-halation dyes in lesser amounts than those usually employed. They are completely and irreversibly decolorized in photographic processing baths, i. e., the color of the dyes will not return in subsequent processing steps. The solubility of the sulfonated oxindole dyes may be effectively controlled by varying the substituent of the benzylidene nucleus. By condensing a sulfonated arylaldehyde with the sulfonated oxindole, a disulfonated product is obtained which is more readily soluble than the product containing a sulfonated group only in the oxindole nucleus. This characteristic is of importance inasmuch as the solubility of the dye may be varied to fit the use thereof in a particular media. For instance, if the dyes are to be used in water-permeable media, such as gelatin, hydroxyethyl cellulose, polyvinyl alcohol, and gelatin substitutes, the disulfonated product is particularly adaptable for this purpose. On the other hand, for alkali soluble resin coatings, such as polyvinyl acetal resins, polyvinyl acetaldehyde acetal resins, and partially hydrolyzed resins as described in United States Patents 1,939,422 and 2,036,092; polyvinyl propionaldehyde, polymerization products, such as polyacrylic acid, polystyreneacrylic acid, polyvinylchloride-polyacrylic acid, and polyacrylic acid nitrile-polystyrenecarboxylic acid as described in United States Patent 2,077,789; alkali soluble resins in which the acid groups are in the form of anhydride groups, as described in United States Patent 2,161,788 and the like, the solubility in such products is achieved by using the dyestuff in which the oxindole nucleus contains a sulfonic acid group as the only nuclear substituent.

The dispersions of the sulfonated oxindoles in any one of the foregoing colloidal carriers are cast in a known manner as coating underneath the emulsion layer, as a backing layer on the rear surface of the emulsion support or as an overcoating on the emulsion. The dispersions of the dyestuffs may also be coated between two layers of multilayer elements employed for color photography which comprises a base coated with two or three light sensitive emulsions, each of which records the desired spectral regions. Inasmuch as the dyestuffs are readily compatible with photographic emulsions, they may also be incorporated into the silver halide emulsion layer and in this relationship act as filter dyes. Best anti-halation results are obtained when a colloidal carrier containing a dye is interposed between the film base and silver halide emulsion layer. The same anti-halation effects may also be obtained by coating the dispersed dye on the opposite side of a film coated with a gelatino silver halide emulsion layer.

In the accompanying drawing the two figures are enlarged sectional views of photographic elements having filter and anti-halation layers prepared according to the present invention.

Figure 1:
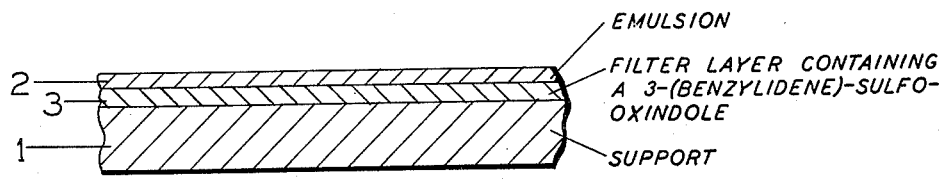
Figure 1 represents an embodiment of the invention in which the filter layer is interposed between the emulsion and support.
Figure 2:
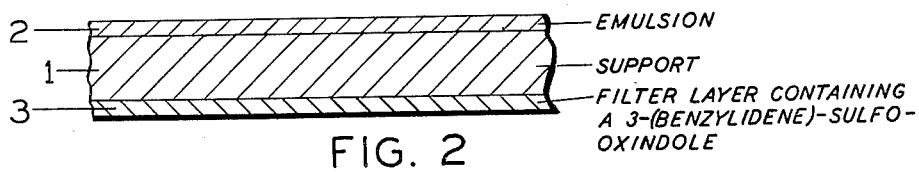
Figure 2 represents an embodiment in which the antihalation layer is in the form of a backing.

In Figures 1 and 2, 1 is the support, 2 is the silver halide emulsion, and 3 the filter or anti-halation layer.

The following examples illustrate the use of the dyes of this invention as filter and anti-halation dyes.

*Example XI*

A photographic filter layer was prepared by dissolving 2 grams of 1-ethyl-3-(4'-hydroxy-3'-sulfobenzylidene)-5-sulfo-oxindole (Example IX) in approximately 20 ml. of a 2% solution of sodium hydroxide. The solution thus obtained was added to 1 liter of an aqueous 5% solution of gelatin in water. The yellow dispersion was utilized as a coating between the blue sensitive top layer and the green sensitive middle layer of a conventional multilayer film.

*Example XII*

A photographic anti-halation layer was prepared by dispersing the following components:

3-(4'-hydroxybenzylidene) - 6 - sulfooxindole _____grams__ 5.2
Sodium hydroxide (0.4 normal) _____ml__ 50.0
Gelatin (5%) _____liter__ 1

A film base was coated with the dispersion in the customary manner. The film was processed and the yellow color of the coating was completely discharged.

It is understood that where in the claims appended hereto, the term "filter layer" is used, that such is intended to include anti-halation layer. While the present invention has been described in considerable detail with reference to certain preferred procedures, materials, and uses, it is understood that the new class of sulfonated oxindole dyes and their use as filter and anti-halation materials is not limited thereto and that numerous variations and modifications described in the foregoing specification may be made. For example, a mixture of two or more of the oxindole dyes may be incorporated in a layer to obtain different speeds or increased neutral density. All such modifications and variations are within the scope of the invention as described by the appended claims.

I claim:

1. A light sensitive photographic element comprising a base and a silver halide emulsion carried thereby, said element having a filter layer containing a dispersion of a sulfonated oxindole dye of the following general formula:

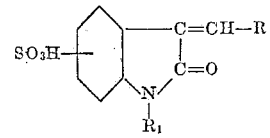

wherein R represents a member selected from the class consisting of an aryl radical of the benzene series and a monocyclic heterocyclic radical selected from the class consisting of furan and thiophene of which the carbon atom in α-position to the hetero atom is directly attached to the methine group and of pyrrole of which the carbon atom in β-position to the hetero atom is directly attached to the methine group, and $R_1$ represents a member selected from the class consisting of hydrogen, alkyl, aryl, and aralkyl radicals.

2. A light sensitive photographic element comprising a base and a silver halide emulsion carried thereby, said element having a filter layer containing a dispersion of a sulfonated oxindole dye of the following formula:

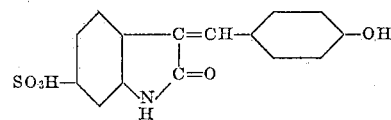

3. A light sensitive photographic element comprising a base and a silver halide emulsion carried thereby, said element having a filter layer containing a dispersion of a sulfonated oxindole dye of the following formula:

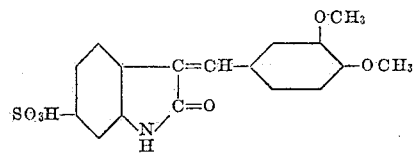

4. A light sensitive photographic element comprising a base and a silver halide emulsion carried thereby, said element having a filter layer containing a dispersion of a sulfonated oxindole dye of the following formula:

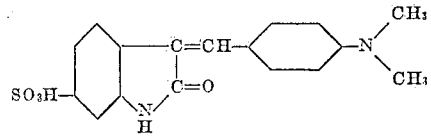

5. A light sensitive photographic element comprising a base and a silver halide emulsion carried thereby, said element having a filter layer containing a dispersion of a sulfonated oxindole dye of the following formula:

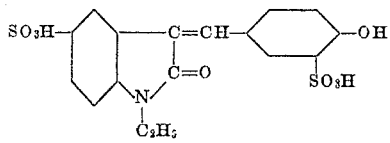

6. A light sensitive photographic element comprising a base and a silver halide emulsion carried thereby, said element having a filter layer containing a dispersion of a sulfonated oxindole dye of the following formula:

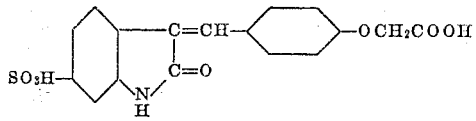

7. A light sensitive photographic element comprising a base, a silver halide emulsion carried thereby and at least one filter layer, said filter layer containing a dispersion of a sulfonated oxindole dye of the following general formula:

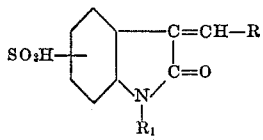

wherein R represents a member selected from the class consisting of an aryl radical of the benzene series and a monocyclic heterocyclic radical selected from the class consisting of furan and thiophene of which the carbon atom in α-position to the hetero atom is directly attached to the methine group and of pyrrole of which the carbon atom in β-position to the hetero atom is directly attached to the methine group, and $R_1$ represents a member selected from the class consisting of hydrogen, alkyl, aryl, and aralkyl radicals.

8. The light sensitive photographic element of claim 7 in which the dye has the following formula:

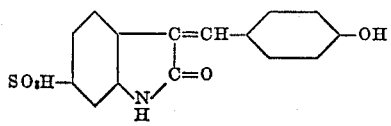

9. The light sensitive photographic element of claim 7 in which the dye has the following formula:

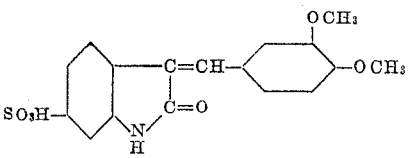

10. The light sensitive photographic element of claim 7 in which the dye has the following formula:

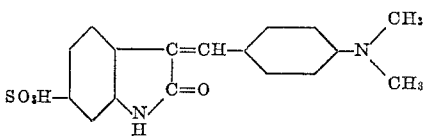

11. The light sensitive photographic element of claim 7 in which the dye has the following formula:

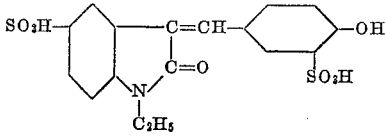

12. The light sensitive photographic element of claim 7 in which the dye has the following formula:

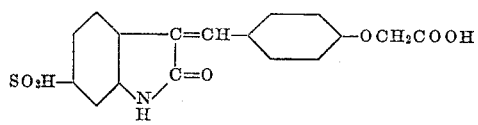

RALPH A. COPELAND.

REFERENCES CITED

The following references are of record in the file of this patent:

UNITED STATES PATENTS

| Number | Name | Date |
|---|---|---|
| 2,390,707 | Heimbach | Dec. 11, 1945 |